(12) United States Patent
Tatom et al.

(10) Patent No.: US 6,692,567 B1
(45) Date of Patent: Feb. 17, 2004

(54) SEISMIC WEIGH-IN-MOTION SYSTEM

(75) Inventors: Frank B. Tatom, Huntsville, AL (US); George W. Herndon, Thomasville, GA (US)

(73) Assignee: VorTek LLC, Huntsville, AL (US)

( * ) Notice: Subject to any disclaimer, the term of this patent is extended or adjusted under 35 U.S.C. 154(b) by 122 days.

(21) Appl. No.: 10/089,323

(22) PCT Filed: Oct. 2, 2000

(86) PCT No.: PCT/US00/27097
§ 371 (c)(1),
(2), (4) Date: Mar. 20, 2002

(87) PCT Pub. No.: WO01/25733
PCT Pub. Date: Apr. 12, 2001

Related U.S. Application Data (60) Provisional application No. 60/157,919, filed on Oct. 6, 1999.

(51) Int. Cl.[7] .............................................. G01G 19/03
(52) U.S. Cl. ..................... 117/1; 177/133; 177/210 FP; 73/580
(58) Field of Search ........................... 177/1, 132, 133, 177/134, 135, 136, 210 FP, 163; 73/580

(56) References Cited

U.S. PATENT DOCUMENTS

| | | | | |
|---|---|---|---|---|
| 3,276,525 A | * | 10/1966 | Cass ........................... 177/163 |
| 5,002,141 A | * | 3/1991 | Loshbough et al. ... 177/210 FP |
| 5,111,897 A | * | 5/1992 | Snyder et al. ............... 177/132 |
| 5,260,520 A | * | 11/1993 | Muhs et al. ............ 177/210 R |
| 5,583,765 A | * | 12/1996 | Kleehammer ................ 702/174 |
| 5,585,604 A | * | 12/1996 | Holm .......................... 177/133 |
| 5,877,455 A | * | 3/1999 | Kyrtsos .......................... 177/1 |
| 5,973,273 A | * | 10/1999 | Tal et al. ........................ 177/1 |
| 6,137,066 A | * | 10/2000 | Wånelid ...................... 177/132 |
| 6,459,050 B1 | * | 10/2002 | Muhs et al. ................. 177/133 |

* cited by examiner

*Primary Examiner*—Randy Gibson
(74) *Attorney, Agent, or Firm*—Lanier Ford Shaver & Payne P.C.

(57) ABSTRACT

A seismic weigh-in-motion system (12) which utilizes a seismic sensor (32) mounted, off-pavement of the highway prior to the point at which the truck (10) enters the deceleration lane at the truck weighing station. The sensor (32) senses seismic vibrations which are transferred into the ground by the moving truck (10). Signals indicative of these vibrations are transmitted through a fiber optic cable (44) connected to a main processor (42) mounted in the weigh-in station. These vibration signals along with signals proportional to the speed of the truck (determined by speed detecting devices/processes (34, 36)) as the truck moves down the highway is processed in the processor (42) to provide an output which is indicative of the weight of the truck. Additional components such as soil temperature (28) and soil moisture content (30) measuring devices provide additional inputs to the processor (42) to increase accuracy of the system.

9 Claims, 7 Drawing Sheets

SEISMIC WEIGH-IN-MOTION SYSTEM

This application claims benefit of Provisional U.S. Patent Application Ser. No. 60/157,919 filed Oct. 6, 1999, entitled "Seismic Weigh-In Motion."

TECHNICAL FIELD

The present invention relates generally to apparatus for determining the weight of a vehicle while it is in motion. More particularly the invention relates to such apparatus which determines the vehicle weight by measuring the seismic vibrations produced as a vehicle moves over a roadbed.

BACKGROUND ART

The advent of electronic screening systems brings with it the need for a low-cost, dependable weigh-in-motion system that can function successfully on the mainline.

The vibrations in the highway pavement represents a detectable seismic signal. The variance of this signal is proportional to truck weight. If the speed of the truck and distance from the truck to the seismic detector of the present invention, Seismic Weigh-In-Motion system are known, the weight of the truck is directly measurable. The Seismic Weigh-In-Motion system is hereinafter referred to as the SWIM system. The seismic weigh-in-motion system of the present invention in its most basic format is an off-pavement screening system that utilizes seismic signals (generated as the vehicle travels on the mainline at up to highway speeds) to determine truck weights.

Devices which disclose the use of electronic screening systems to target a moving vehicle are set forth in the following United States patents, namely: U.S. Pat. No. 4,337,528 to Clinard et al.; U.S. Pat. No. 4339,010 to Malikov et al.; U.S. Pat. No. 4,539,650 to Griffin; U.S. Pat. No. 4,957,178 to Milk; U.S. Pat. No. 4,712,423 to Siffert; and, U.S. Pat. No. 4,560,016 to Ibanez.

U.S. Pat. No. 4,337,528 discloses an electronic screening system which provides seismic detection of a target and uses a geophone to detect earth vibrations caused by actions of a target such as a moving vehicle. The vibrations are wideband amplified and band-passed filtered with pass banks being fed to threshold detectors. The output of the threshold detectors are fed to a diode AND logic circuit, the output thereof indicating the presence of a target, such as a vehicle. Only the presence of such a target is available from this screening system.

All of the remaining patents to Malikov (U.S. Pat. No. 4,339,010), Griffin (U.S. Pat. No. 4,539,650), Milk (U.S. Pat. No. 4,957,178), Seifert (U.S. Pat. No. 4,712,423) and Ibanez (U.S. Pat. No. 7,560,016) are directed to electronic screening systems which are utilized for weighing transport vehicles in motion; however, each of these patents describe an intrusive screening system which requires the use of some type of bending or flexure member which must bend or flex under the weight of the moving vehicle to provide an output signal which is proportional to the amount of bending or flexure. Such intrusive systems are subjected to mechanical failure due to extensive flexing or bending of the member, thereby, requiring an undue amount of maintenance.

A Lawrence Livermore National Laboratory (LLNL) report entitled "A Seismic Weigh-In-Motion Method for Weight Estimation of Vehicles on the Highway" authored by F. Dowler, D. Lager, and M. Barth was printed in January, 1993. The report is an informal report intended for internal or limited external distribution and was not released outside LLNL until November 1999. The report represents a preliminary treatment of the concept of weighing a vehicle in motion by means of a seismic signal.

Whenever in motion a truck encounters rolling resistance. In overcoming such resistance and in interacting with the ground through vertical oscillations, the truck transfers a considerable amount of energy into the ground. Some portion of this energy is reflected back into the atmosphere, but a sizeable fraction takes the form of short-period (SP) seismic vibrations, with the remainder transformed into thermal energy.

In the present inventive concept, the seismic source is located on the air-ground interface, and only surface waves appear to be of interest, so far as short-period vibrations are concerned. Surface waves generally are divided into Love waves, which exhibit secondary horizontal (SH) wave motion, and Rayleigh waves, which are a combination of primary (P) and secondary vertical (SV) type waves. The SWIM system of the present invention detects both Rayleigh and Love waves.

The present seismic detection system will normally be deployed as part of a permanent weighing/inspection installation but may be deployed as a portable unit, if desired. The SWIM system screens for vehicle-produced, in-ground (seismic) signals produced by heavy trucks that are traveling on mainline pavements at highway speeds. Vehicles exceeding prescribed parameters would be instructed to pull into the weigh station or inspection area to be weighed on static scales (platform, portable, etc.). Pull-in instructions would be by means of either in-cab transponders and/or dedicated visual external weigh station signals/signs.

On multi-lane highways such as interstate highway routes trucks would be required to use the right-hand (outside) lane. Additionally, trucks would be required to maintain a constant speed which would be consistent with the posted speed limit for that portion of the highway. Where needed and depending largely on roadway surface condition, positive lane definition would be achieved through the use of transverse slots or rumble slips installed on the pavement surface in the designated lane in advance of the SWIM sensor unit. These strips or slots, through their inherent characteristic of initiating vibration in the passing vehicle, would be tuned to provide a unique signature to aid in the speed and identification of a specific vehicle. An added benefit of installing rumble strips or slots would be to help eliminate concern over registering heavier, but inappropriate, target vehicles such as buses and motor homes traveling in adjacent lanes.

DISCLOSURE OF THE INVENTION

An efficient, rapid, and accurate system for weighing trucks while the trucks are in motion is provided by the seismic weigh-in-motion system of the present invention.

The seismic weigh-in-motion system includes a seismic sensor system which is mounted adjacent (off pavement) of the highway prior to the point at which the truck enters the deceleration lane at a truck weighing station. The sensor senses seismic vibrations transmitted into the ground by the moving truck. Signals indicative of these vibrations are transmitted through a fiber optic cable to a seismic weigh-in-motion processor mounted inside the weighing station.

This vibration signal along with the speed of the truck , (determined by speed detecting devices as described hereinbelow) as it passes the sensor system is processed in the processor to provide an output thereof which is indicative of the weight of the truck. Additional components such as a soil temperature measuring device and a soil moisture content measuring device may be mounted at the sensor system in contact with or imbedded in the ground to provide information indicative of soil temperatures and soil moisture content through the fiber optics cable to the processor in the weighin-station.

It is therefore an object of the present invention to provide an electronic screening system for weighing moving vehicles, such as trucks while the vehicles or trucks are in motion.

It is a further object of the present invention to provide such an electronic screening system in which the vibrations of the truck, as it moves along a highway, are sensed and processes, and, signals representative of the amplitude and frequency of the vibrations are coupled with the measured speed of the moving truck to produce an output indicative of the truck weight.

The foregoing objects are met by the present invention and will become more readily apparent from the following detailed description, considered in conjunction with the accompanying drawings.

SUMMARY OF THE INVENTION

BEST MODE(S) FOR CARRYING OUT THE INVENTION

Figure 1:
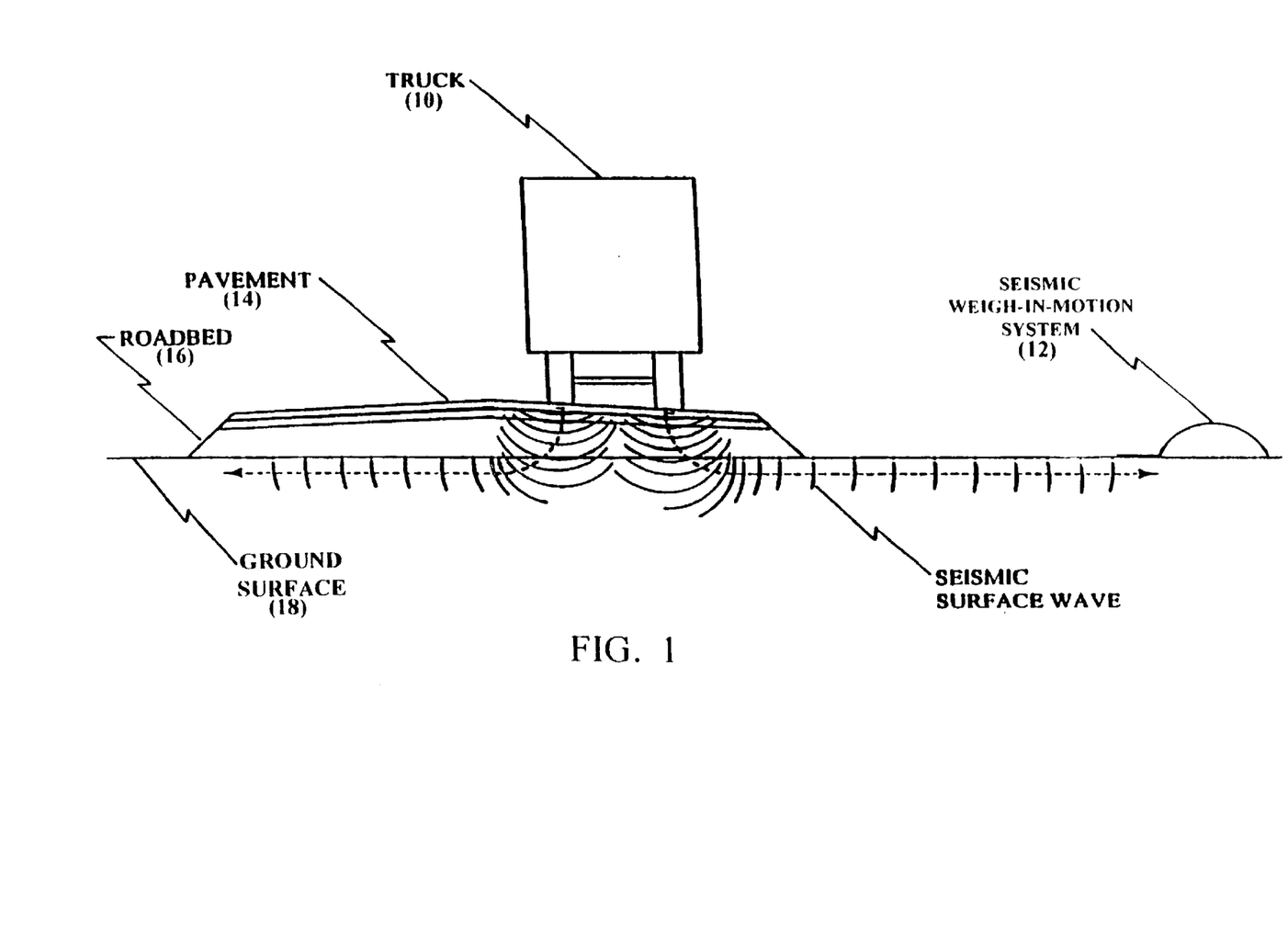
FIG. 1 is a rear elevational view of a truck traveling on a highway by the weigh-in-motion sensor assembly of the present invention.

FIG. 1 is an elevational rear diagrammatic view of a highway showing a truck 10 moving along the highway adjacent the truck seismic weigh-in-motion (SWIM) system 12 of the present invention. The drawing illustrates the road pavement 14 being supported on a roadbed 16 provided on the ground surface 18. The seismic weigh-in-motion system 12 includes a seismic sensor system 26 (FIG. 4) which is mounted on ground surface 18, off of the pavement of the highway as shown in FIG. 1.

Figure 4:
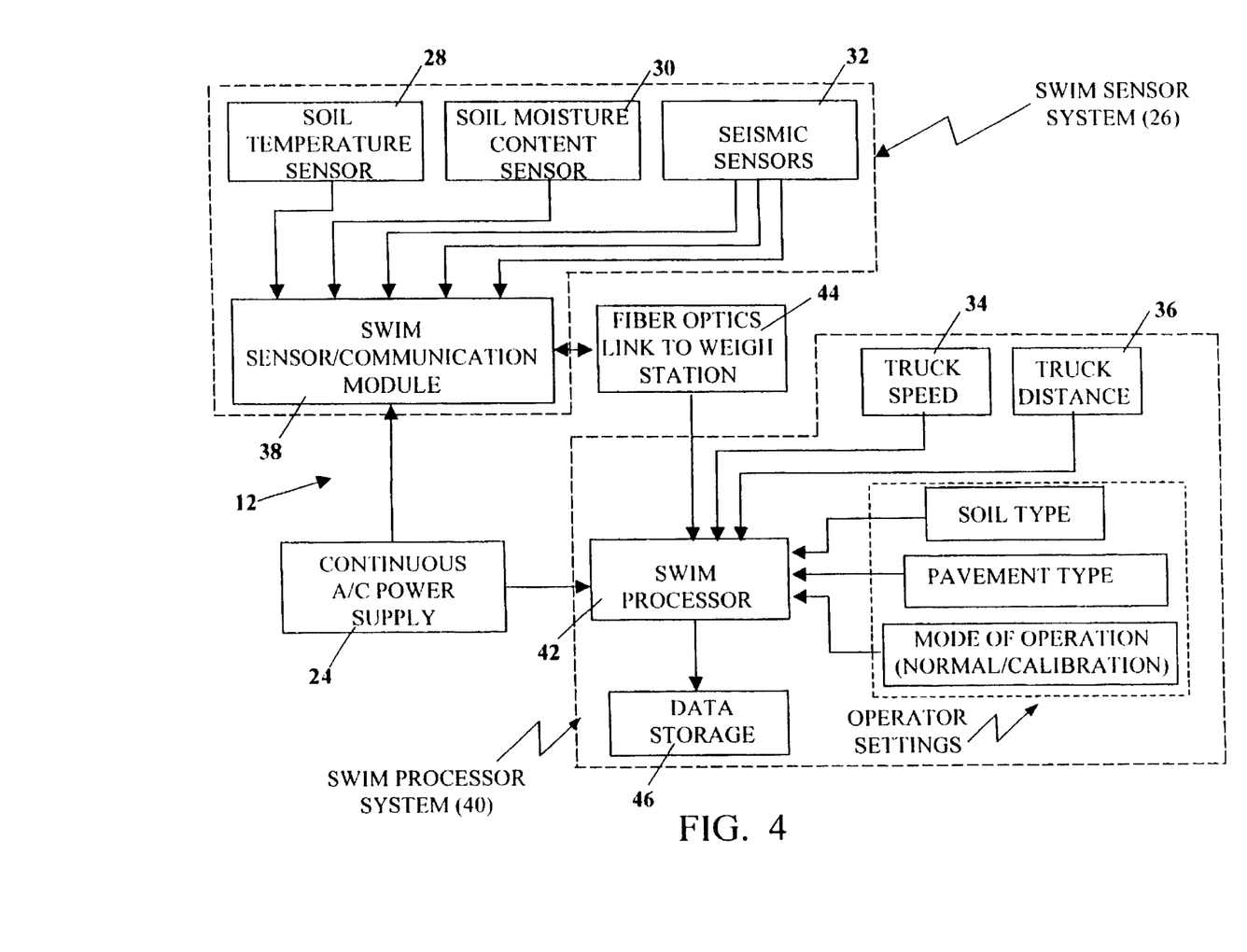
FIG. 4 is a is a block diagram of the weigh-in-motion system of the present invention.

As the truck travels past the seismic weigh-in-motion sensor system 26, seismic vibration signals are transmitted through the ground to seismic sensors 32 (FIG. 4) of the seismic sensor system 26 (FIG. 4). Seismic sensors 32 are discussed in detail hereinbelow.

Figure 2:
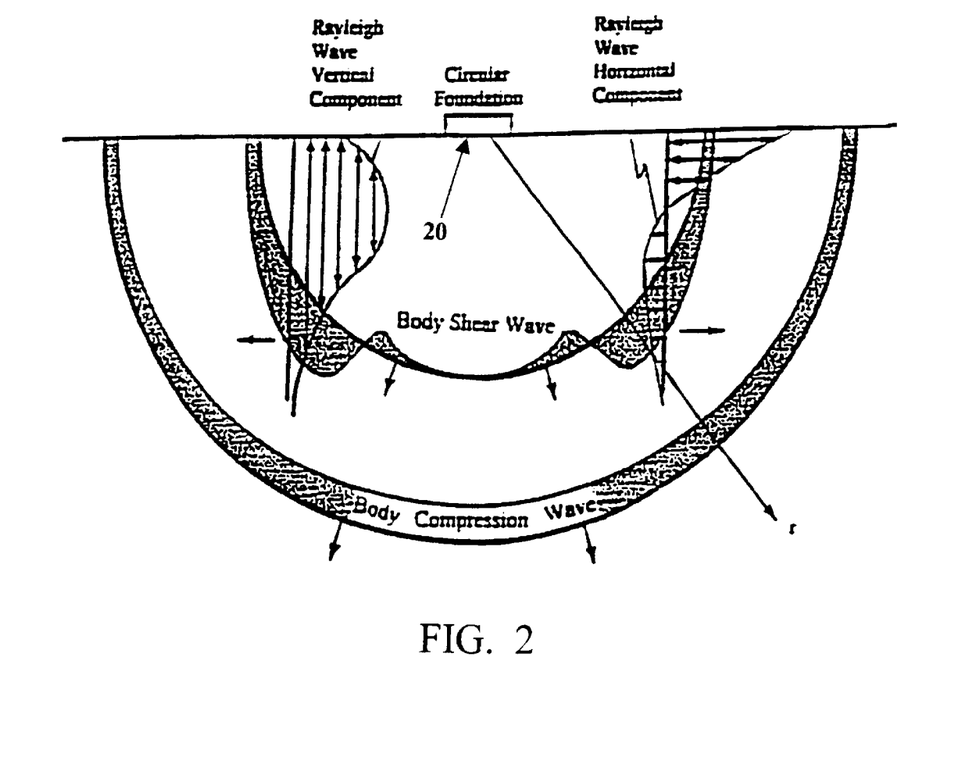
FIG. 2 is a diagrammatic view of a seismic wave field generated from a circular foundation on a homogeneous isotopic elastic half sphere.

Based on an analysis of the truck/highway interaction, it is assumed that this interaction produces a dynamic stress, which acts normal to a circular ground area, albeit a moving circular area 20, as shown in FIG. 2. The wave field produced by a truck will be approximated by a wave field from a collection of circular foundations, each undergoing vertical oscillations at the surface of an elastic half-space. A simplified analysis of the energy transmission coupled into the ground by the each foundation shows that both body waves and surface waves are produced, as shown in FIG. 2. The distance from the source to the each wave front in the figure is drawn in proportion to the velocity of each wave for a medium with a Poisson ratio of 0.25. The body P wave has approximately twice the speed of the body S wave, which is primarily due to the direction of particle motion caused by the wave. In the case of a P wave the motion is in the direction of travel, while the S wave motion is perpendicular to the direction of travel.

Depending on the characteristics of the ground layering below the circular foundation, the majority of surface waves consist of Rayleigh waves, which propagate radially outward along a cylindrical wave front and consist of a horizontal component in the direction of propagation and a vertical component. The remainder of the surface waves are Love waves, which have a single horizontal component perpendicular to the direction of propagation. A unique characteristic of the Rayleigh wave is its retrograde elliptical shape which diminishes with depth, as shown in FIG. 2. As the waves propagate outward, they encounter a greater volume of material and therefore the energy density decreases with increasing distance from the source. It can be shown that in a three-dimensional infinite solid the amplitude of body waves decreases by a factor of $1/r$, with r the radial distance from the source. However, on the surface of an elastic half-space the amplitude of body waves decreases by a factor of $1/r^2$. By comparison the amplitude of Rayleigh waves decreases by a factor of $1/\sqrt{r}$.

For a vertically oscillating, uniformly distributed, circular energy source, without any horizontal velocity, on the surface of a homogeneous, isotropic, elastic half-space, the distribution of total input energy among the three elastic waves previously noted was determined to be 67% Rayleigh (R) wave, 26% body S wave, and 7% body P wave. For this case Love waves are theoretically nonexistent. The fact that two-thirds of the total input energy is transmitted away from vertically oscillating footing by the Rayleigh wave, and that the Rayleigh wave decays much more slowly with distance than the body waves indicates that the Rayleigh wave is the primary seismic vibration to be detected on the surface.

For the case of a source moving with a horizontal velocity in a nonhomogeneous half-space, the distribution of energy among the different wave types is somewhat modified, with Love waves becoming more significant. Rayleigh waves, however, remain the most energetic type of waves for this situation.

Figure 3:
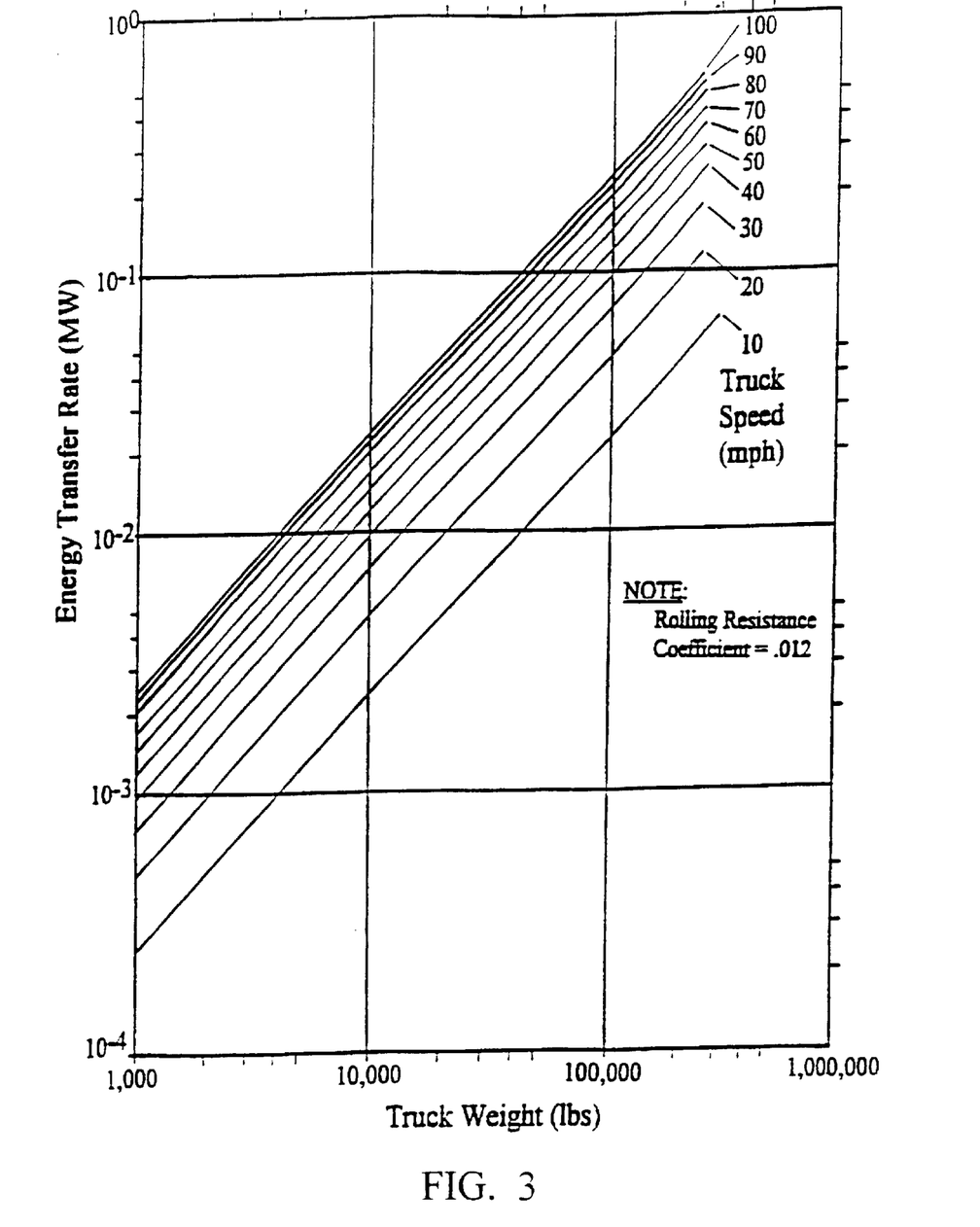
FIG. 3 is a graph illustrating energy transfer from a moving truck to ground.

A simple relation between truck speed and seismic signal can be derived from conservation of energy principles. Based on automotive engineering studies, the rolling resistance $R_r$, of an automotive wheel is $R_r = KW$ where $K \cong 0.012$, W=vehicle weight. If the vehicle moves with velocity. V, the energy rate to overcome the resistance is $E_R = R_r V = 0.012$ WV. Based on this relation the energy transfer rate can be plotted as a function of truck weight and speed as shown in FIG. 3. This energy rate must be supplied by the engine in the vehicle, and some portion of this energy rate would be transmitted into the ground as vibrations.

Now the truck represents a moving energy source. The strength of the seismic signal is related to the rate of energy transfer. Actually the signal strength (in terms of standard deviation) would be proportional to the square root of the rate of energy transfer while the signal energy (in terms of variance) would be directly proportional to the rate of energy transfer. The problem is that the signal is not stationary in terms of its strength, because its distance to the sensor is constantly changing.

To correct for nonstationary, two actions-must be taken. First, the only time period during which the signal is measured should coincide with the time period when the truck is nearest the sensor. Second, a correction factor should be applied to the length of the time period, based on the speed of the truck. This correction factor would be inversely proportional to the speed of the truck. Basically the signal from a slower-moving truck should be taken over a longer time period than the time period over which the signal is taken from a faster-moving truck.

Truck Distance Effects

Based on standard lane widths of 12 feet, the distance between the truck and the SWIM package would be designed to vary somewhat, to accommodate varying truck axles (96–102 in.) and the specific route that the driver might choose to drive (e.g., closer to one side of the lane or the other). As noted above, the seismic waves of interest are Rayleigh waves, and the amplitude of such waves varies inversely with the square root of the distance between the source and the detector. The magnitude of the effect of distance will depend in part on the width of the lane and in part on the spacing between the lane and the SWIM geophones (sensors 32). The wider the lane, the greater the potential effect, and likewise the smaller the spacing between the lane and the geophones, the greater the potential effect.

Soil and Pavement Characteristics

Two significant effects on the amplitude and frequency content of truck seismic waves are the topography and the geologic structure of the underlying ground formation. It has been found that topographic variations of 1 to 3 m decrease the vibration level at a rate of 3 dB per meter, and that topographic features on the order of 0.25 of the wavelength severely attenuate surface waves. It has also been found some similarity exists between the decay rates for rock and soft soils for surface waves. Clear trends were found in the magnitude of the vibrations between different soil types but the decay rates with distance were roughly similar. It is known that soft soils produce larger vibrations than do stiffer soils or rock. Based on the preceding findings, with the assumption of relatively even topographic features on both deceleration and acceleration ramps, where the SWIM system would be installed, a correlation can be established between distance and seismic attenuation. However, the magnitude of the seismic vibration will be a function of soil type and, in some situations, soil conditions such as fluctuations in moisture content, and soil temperature.

It is unlikely, however, that the changes in soil moisture, which for clayey soils affect the stiffness of soils, will be significant, considering the fact that the majority of Rayleigh waves propagate outward at depths no greater than approximately one wave-length beneath the surface. It has been estimated that the wavelengths for traffic-induced vibration ranged from 30 to 100 meters. This would indicate that the behavior of the Rayleigh wave results from the effects of propagating through 30 to 100 meters of ground immediately beneath the surface. Since moisture variations are typically confined to the top 1 to 3 meters, it is unlikely that moisture variations will strongly affect the amplitude of the traffic-induced vibrations.

Based on a similar line of reasoning, temperature effects should be even smaller than the effects of moisture levels.

Differences in pavement types, especially stiffness characteristics, should also have some effect on the surface wave propagation. However, it has been found that the differences produced by asphalt and concrete pavements were relatively small.

FIG. 4 is a block diagram of the seismic weigh-in-motion (SWIM) system 12 of the present invention for detecting seismic signals. The seismic weigh-in-motion system 12 is disposed for continuous, extended operation and is connected to an AC power source 24.

As seen in FIG. 4 the seismic weigh-in-motion system 12 of the present invention includes a SWIM sensor system 26, a SWIM processor system 40 and a fiber optics link 44 extending from the sensor system 26 to the processor system 40. Included in the sensor system 26 are seismic sensors 32, a soil temperature sensor 28 and a soil moisture content sensor 30. A sensor/communication module 38 of the sensor system 26 is disposed for receiving output signals from temperature sensor 28, soil moisture content sensor 30 and seismic signal sensors 32 and for amplifying and transmitting these signals to the processor system 40 through fiber optics link 44.

The processor system 40 includes a truck speed determinator 34, a truck distance determinator 36 and a SWIM system main processor 42 and a data storage 46. Data relating to truck speed determinator 36 and truck distance determinator 36 are input into the main SWIM processor 42. The processor also receives operator inputs relating to soil type (clayey, etc.), pavement type (asphalt, etc.), and mode of operation (normal/calibration) and provides data storage information to the data storage 46.

It is to be understood that soil temperature and soil moisture content may be provided by commercially available hardware. For example, the Campbell Scientific temperature probe 107 (or similar probe) may be used to provide soil temperature information. Also, the Campbell Scientific CS 615 water content reflectometer (or similar device) may be used to measure the soil water content.

Figure 5:
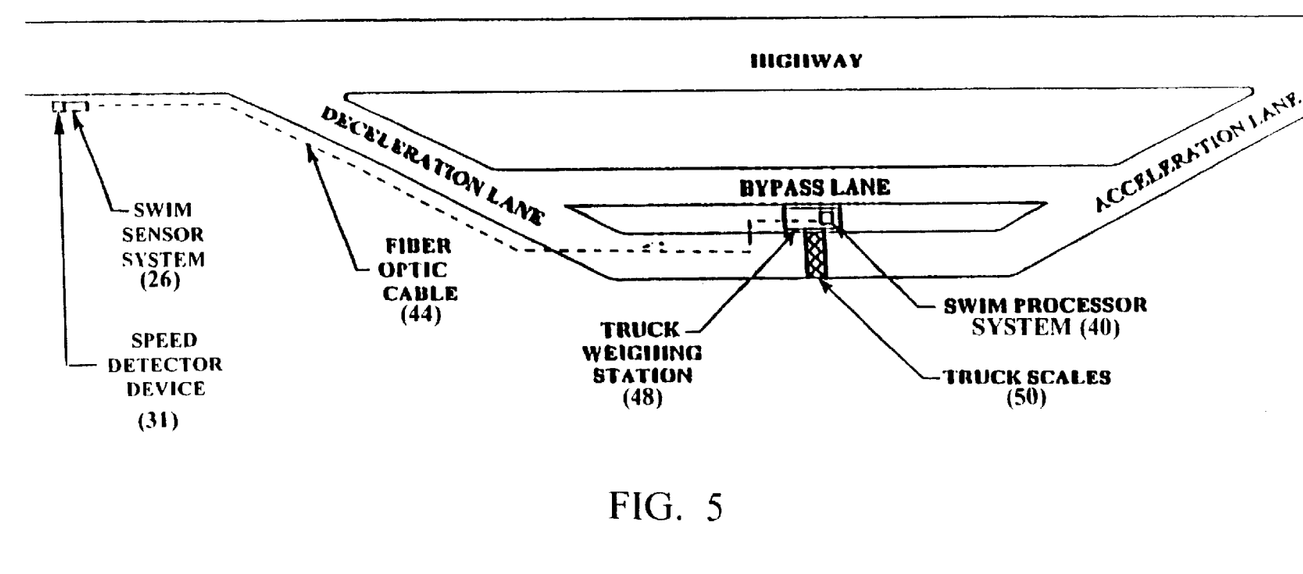
FIG. 5 is a diagrammatic view of the seismic weigh-in-motion system of the present invention. A speed detection system is shown positioned at the SWIM sensor system of the seismic weigh-in-motion system of the present invention.

FIG. 5 illustrates the position of the SWIM sensor system 26 relative to the SWIM processor system 40 at a weighing station. As seen in FIG. 5, the sensor system 26 is positioned upstream adjacent to the highway prior to the point where the highway branches to form a deceleration lane which leads to the truck weighing station 48 and truck scales 50. A speed detector device 31 (radar device, etc.) to measure the speed of the incoming truck, is shown mounted at the sensor system 26, but may be mounted elsewhere, if desired. Other speed detecting systems may be utilized as described hereinbelow.

Figure 6:
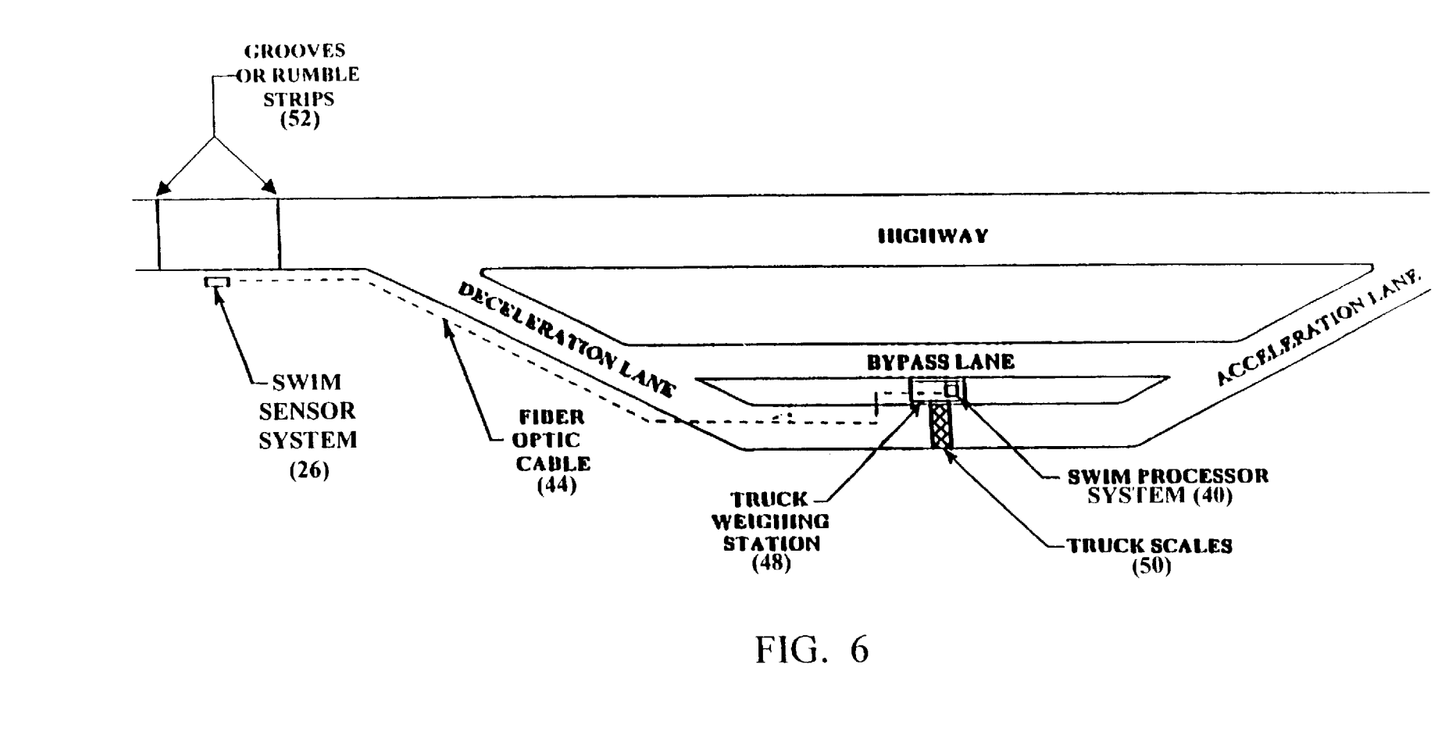
FIG. 6 is a view similar to FIG. 5 but illustrates the use of rumble strips or grooves for providing speed information to the processor system of the seismic weigh-in-motion system of the present invention.

FIG. 6 is a view similar to FIG. 5 but illustrates the use of rumble strips or grooves 52 to provide vibrations which are converted to speed in the processor. As the leading axle of each truck passes over the first groove or rumble strip a distinct seismic signal pulse is generated which is detected by geophones. Based on the time of arrival of this pulse, with the distance from the geophones to groove or rumble strip known, the time at which the leading truck axle passes over the groove or rumble strip can be computed. Likewise, when the leading axle passes over the second groove or rumble strip a second seismic pulse is generated which is also detected by geophones. As before, the time of passage of the axle over the second groove or rumble strip can be determined from the time of arrival of the second pulse, combined with a knowledge of the distance from the geophones to the second groove or rumble strip. The speed of the truck is then determined by dividing the distance between the grooves or rumble strip by the difference between the times of passage over the two grooves or rumble strips.

It is to be understood that seismic signal sensors referred to herein are known in the art. An example of such seismic signal sensors are disclosed in U.S. Pat. No. 5,370,925 entitled "Method and Apparatus for Seismic Tornado Detection", issued to Frank B. Tatom et al. on Jan. 3, 1995, and U.S. Pat. No. 5,801,636 entitled "Method and Apparatus for Seismic Tornado Detection", issued to Frank B. Tatom et al. on Sep. 1, 1998. Both patents are incorporated herein by reference.

Figure 7:
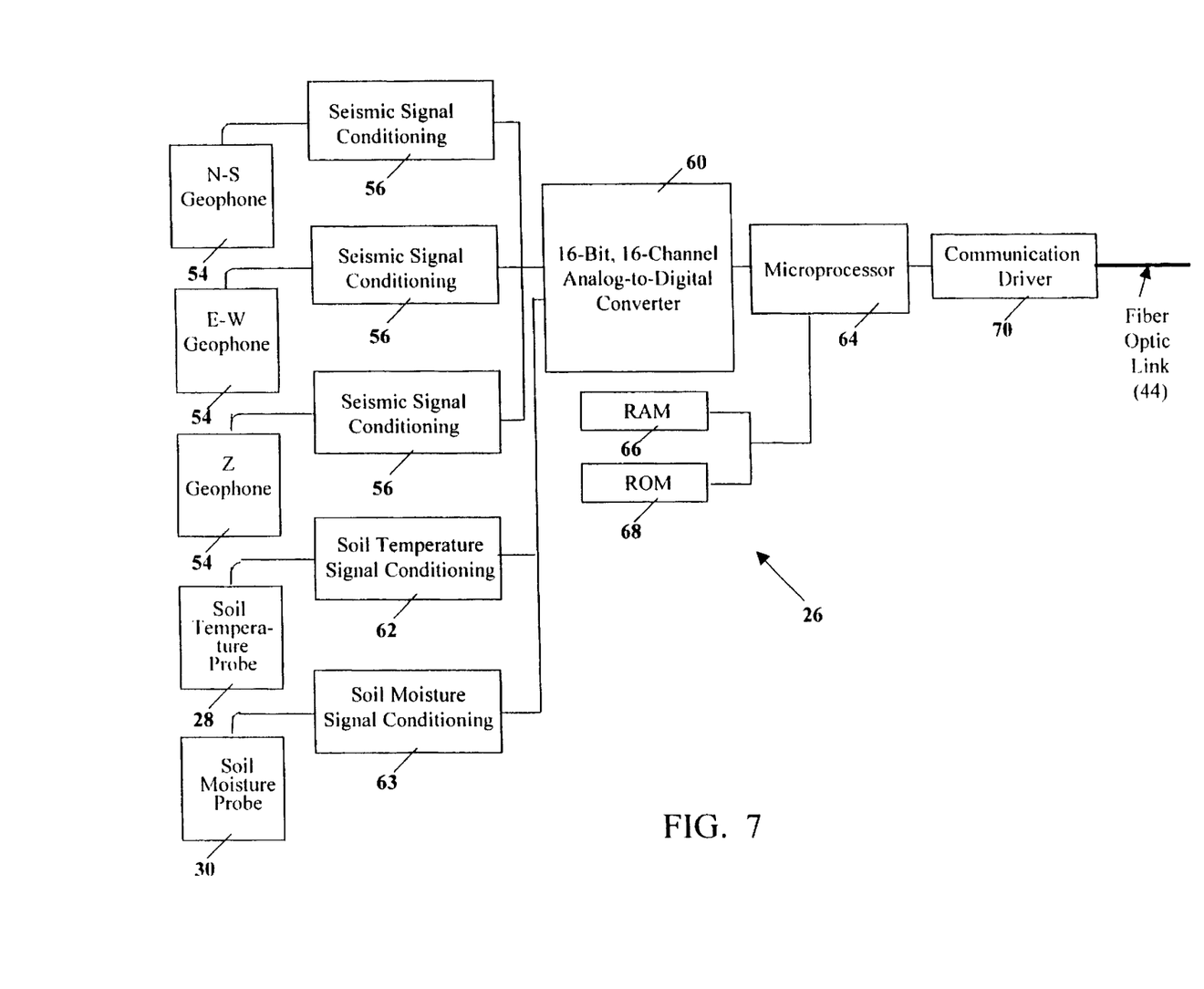
FIG. 7 is a block diagram of the SWIM weigh-in-motion sensor system of the weigh-in-motion system of the present invention

FIG. 7 is a block diagram of a 3-channel seismic sensor system which utilizes the principles of the seismic sensors disclosed in the above patents issued to Frank B. Tatom et al.

As shown in FIG. 7, the seismic sensor system 26 of the present invention comprises an instrument package including three similar parallel circuits for measuring the short-period truck seismic signal. Each circuit contains a seismic sensor 32 (FIG. 4) i.e., geophone 54 (Mark Products Model L-10B, for example). Each geophone represents separately the north-south, east-west, and vertical component of the seismic signal. The above-mentioned soil temperature sensor 28 (Campbell Scientific Probe, Model 107, or the like) and the above-mentioned soil moisture sensor 30 (Campbell Scientific Probe Model CS 615, or the like) are part of the seismic sensor system 26.

The output of each of the geophones 54 and probes 28 and 30 is respectively passed to a 16 bit, 16 channel analog-to-digital converter (ADC) 60 through seismic signal conditioners 56 and soil temperature and moisture content signal conditioners 62 and 64. The sensor system utilizes a PC/104 bus board, which serves as an interface between the ADC 60 and an 8-bit processor, such as a 8051 derivative 64. The sensor system microprocessor 64 provides storage data to a ROM 68 and RAM 66. The output of the microprocessor 64 is input into a communications driver 70 which initiates the transmission of data from the microprocessor 64, through the fiber optic cable 44 to the main microprocessor 42 at the truck weighing stations 48.

It is to be understood that although a fiber optic cable is described as the signal transmission means between the seismic signal sensor system 26 and the SWIM processor system 40 other signal transmission means may be utilized, if desired.

Thus, although there have been described particular embodiments of the present invention of a new and useful Seismic Weigh-In Motion System, it is not intended that such references be construed as limitations upon the scope of this invention except as set forth in the following claims.

What is claimed is:

1. An electronic screening system for determining the weight of a moving vehicle as the vehicle travels along a roadway comprising:

a sensor system including seismic signal sensor means mounted off-road at a first location and disposed to sense and measure seismic vibrations generated as the vehicle travels along the roadway in the area of said seismic signal sensor means, said seismic signal sensor means disposed to transmit signals proportional to said vibrations;

speed sensing means for measuring the speed of said vehicle and outputting electrical signals representative of said speed;

a processor system including a main processor means mounted at a second location remotely from said first location, said main processor disposed for receiving and processing said signals from said seismic signal sensor means and said speed sensing means to provide a processed output which is representative of the weight of the truck; and means for conveying said signals from said seismic sensor signal means and said speed sensing means to said main processor means.

2. An electronic screening system as in claim 1 wherein a vehicle weighing station is disposed adjacent to said roadway and includes a deceleration lane leading off said roadway to an enclosure, and an acceleration lane leading away from said enclosure and leading back onto said roadway, said first location being adjacent said roadway upstream of said deceleration lane said second location being at said enclosure.

3. An electronic screening system as in claim 2 wherein said means for conveying said signals is a fiber optic cable.

4. An electronic screening system as in claim 3 wherein said seismic sensor means includes a plurality of seismic signal sensing members in direct contact with said ground surface to transmit signals directly from the ground surface which are proportional to seismic vibrations induced into said ground surface by the moving truck.

5. An electronic screening system as in claim 4 including a first seismic signal conditioning means electrically connected to a first seismic signal sensing member of said plurality of signal sensing members for receiving and conditioning said electrical signal from said first seismic signal sensing member, an A/D converter connected to said first seismic signal conditioning means to receive the conditioned electrical signals therefrom, a microprocessor electrically connected to said A/D converter to receive converted digitized signals and for processing the data contained therein, a communication driver connected to said microprocessor for driving the processed signals through said fiber optic link to said main processor, said first seismic signal sensing member being positioned to sense vibrations in north-south directions.

6. An electronic screening system as in claim 5 including a second seismic signal conditioning means electrically connected to a second seismic signal sensing member of said plurality of signal sensing members for receiving and conditioning said electrical signals from said second seismic signal sensing member, said A/D converter connected to said second seismic signal conditioning means to receive the conditioned electrical signals therefrom, said microprocessor electrically connected to said A/D converter to receive converted digitized signals and for processing the data contained therein, said communication driver connected to said microprocessor for driving the processed signals through said fiber optic link to said main processor, said second seismic signal sensing member being positioned to sense vibrations in east-west direction.

7. An electronic screening system as in claim 6 including a third seismic signal conditioning means electrically connected to a third seismic signal sensing member of said plurality of signal sensing members for receiving and conditioning said electrical signals from said third seismic signal sensing member, said A/D converter connected to said third seismic signal conditioning means to receive the conditioned electrical signals therefrom, said microprocessor electrically connected to said A/D converter to receive connected digitized signals and for processing the data contained therein, said communication driver connected to said microprocessor for driving the processed signals through said fiber optic link to said main processor said third seismic signal sensing member being positioned to sense vibration in the vertical direction.

8. An electronic screening system as in claim 7 including a soil temperature sensing device mounted at said first location for providing electrical signals representative of soil temperature, a fourth conditioning means electrically connected to said soil temperatures sensing device for receiving said signals therefrom, said A/D converter connected to said fourth seismic signal conditioning means to receive the conditioned electrical signals therefrom, said microprocessor electrically connected to said A/D converter to receive converted digitized signals and for processing the data contained therein, said communication driver connected to said microprocessor for driving the processed signals through said fiber optic link to said main processor.

9. An electronic screening system as in claim 8 including a soil moisture sensing device mounted at said first location for providing electrical signals representative of soil moisture at said first location, a fifth conditioning means electrically connected to said soil moisture sensing device for receiving said signals therefrom, said A/ID converter connected to said seismic signal conditioning means to receive the conditioned electrical signals therefrom, said microprocessor electrically connected to said A/D converter to receive converted digitized signals and for processing the data contained therein, said communication driver connected to said microprocessor for driving the processed signals through said fiber optic link to said main processor.

* * * * *